United States Patent
Hurley

(10) Patent No.: US 6,171,090 B1
(45) Date of Patent: Jan. 9, 2001

(54) COMPRESSOR HAVING A LUBRICANT PICK-UP TUBE GUARD

(75) Inventor: David C. Hurley, Onsted, MI (US)

(73) Assignee: Tecumseh Products Company, Tecumseh, MI (US)

(*) Notice: Under 35 U.S.C. 154(b), the term of this patent shall be extended for 0 days.

(21) Appl. No.: 09/098,858

(22) Filed: Jun. 17, 1998

(51) Int. Cl.$^7$ .......................... F04C 29/02; F01M 11/03
(52) U.S. Cl. ........................ 418/94; 184/6.18; 184/6.23
(58) Field of Search .................... 418/94; 184/6.16, 184/6.18, 6.23

(56) References Cited

U.S. PATENT DOCUMENTS

| | | | |
|---|---|---|---|
| 1,964,415 | 6/1934 | Van Deventer | 417/356 |
| 3,098,604 | 7/1963 | Dubberley | 417/372 |
| 3,259,307 | 7/1966 | Ayling | 417/372 |
| 3,388,855 | 6/1968 | Ayling et al. | 184/6 |
| 3,666,380 | 5/1972 | Ellis | 417/415 |
| 3,736,076 | 5/1973 | Ayling | 417/372 |
| 3,762,837 | 10/1973 | Ellis et al. | 417/360 |
| 4,140,441 | 2/1979 | Patterson | 417/424 |
| 4,421,453 | 12/1983 | Hoff et al. | 415/88 |
| 4,565,503 | * 1/1986 | Wise | 184/6.16 |
| 4,621,993 | 11/1986 | Nakamura et al. | 418/55.6 |
| 4,850,819 | 7/1989 | Bush et al. | 417/368 |
| 5,114,322 | 5/1992 | Caillat et al. | 418/55.6 |
| 5,168,960 | 12/1992 | DiFlora | 184/6.16 |
| 5,197,868 | 3/1993 | Caillat et al. | 418/55.5 |
| 5,219,281 | 6/1993 | Caillat et al. | 418/55.6 |

FOREIGN PATENT DOCUMENTS

| | | | |
|---|---|---|---|
| 59-221483 | 12/1984 | (JP) . | |
| 61-11479 | * 1/1986 | (JP) | 418/94 |
| 61-72891 | * 4/1986 | (JP) | 418/94 |
| 2-86988 | * 3/1990 | (JP) | 418/94 |
| 2-108890 | * 4/1990 | (JP) | 418/94 |

* cited by examiner

Primary Examiner—John J. Vrablik
(74) Attorney, Agent, or Firm—Baker & Daniels

(57) ABSTRACT

A compressor assembly including a housing having an oil sump containing a liquid lubricant, a compressor mechanism disposed within the housing, a vertical, rotatable shaft associated with the compressor mechanism and provided with a conduit having a downwardly directed open end extending beneath the surface level of the lubricant and through which oil is conveyed to the compressor mechanism, whereby the lubricant is drawn into the conduit open end, and a guard in surrounding relationship with, and having an aperture disposed beneath and proximate to, the conduit open end, the guard fixed relative to the housing, the sump in fluid communication with the conduit through the aperture.

7 Claims, 3 Drawing Sheets

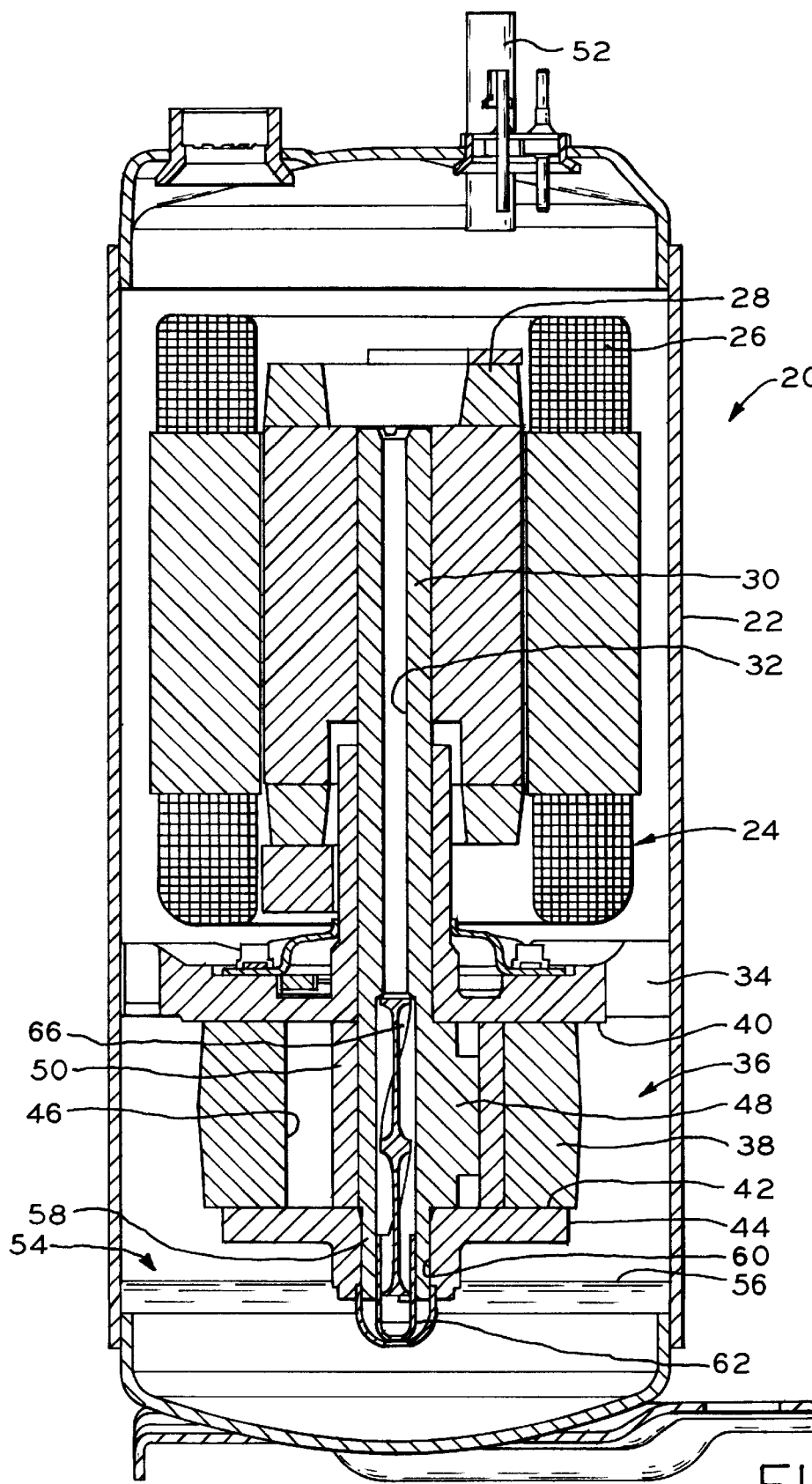
FIG_1

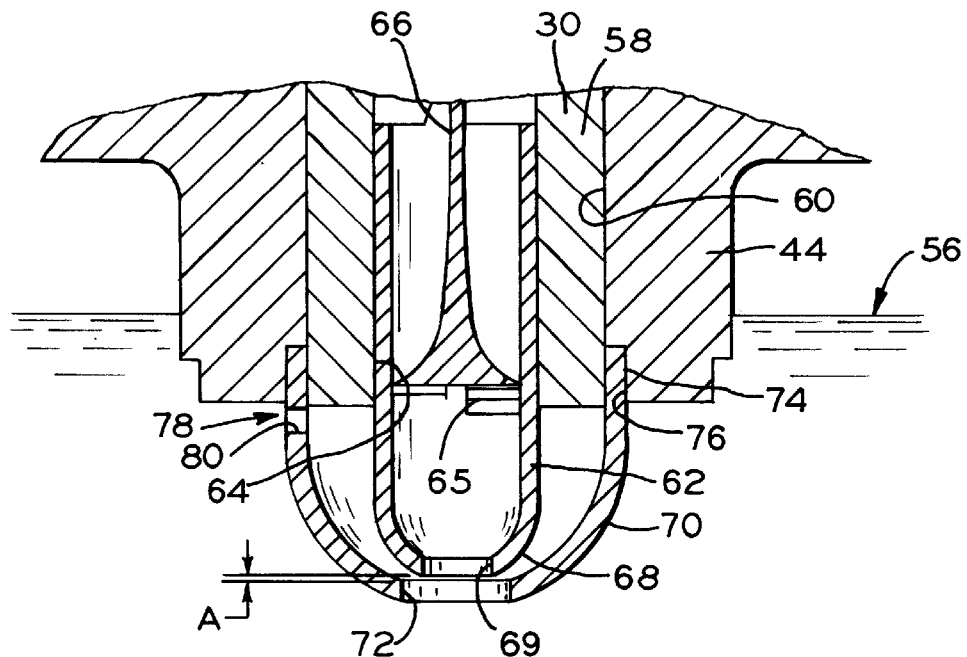
FIG_2
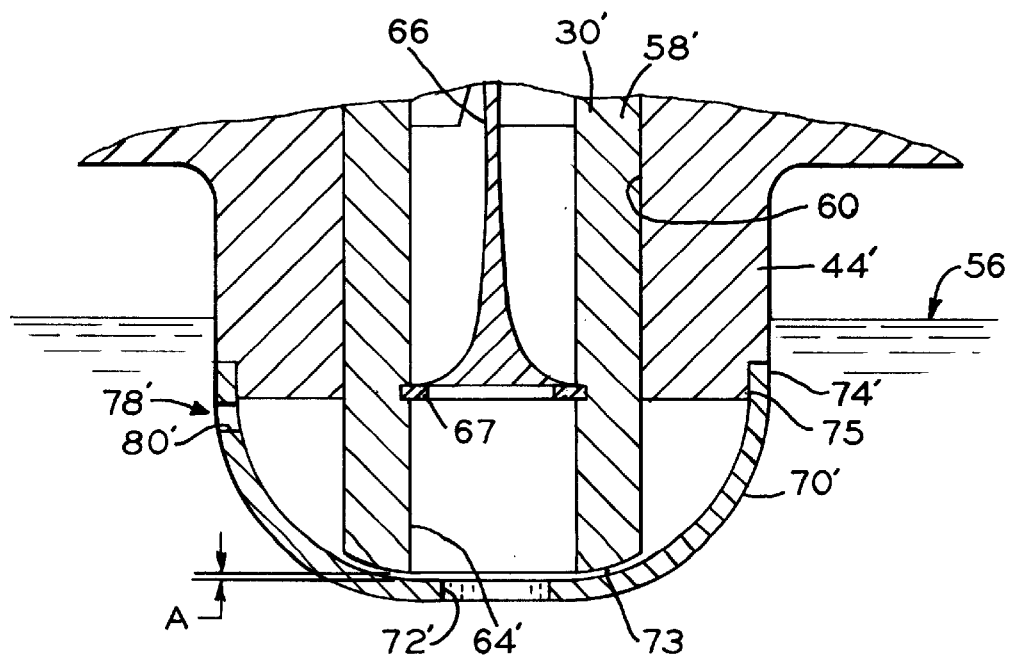
FIG_3

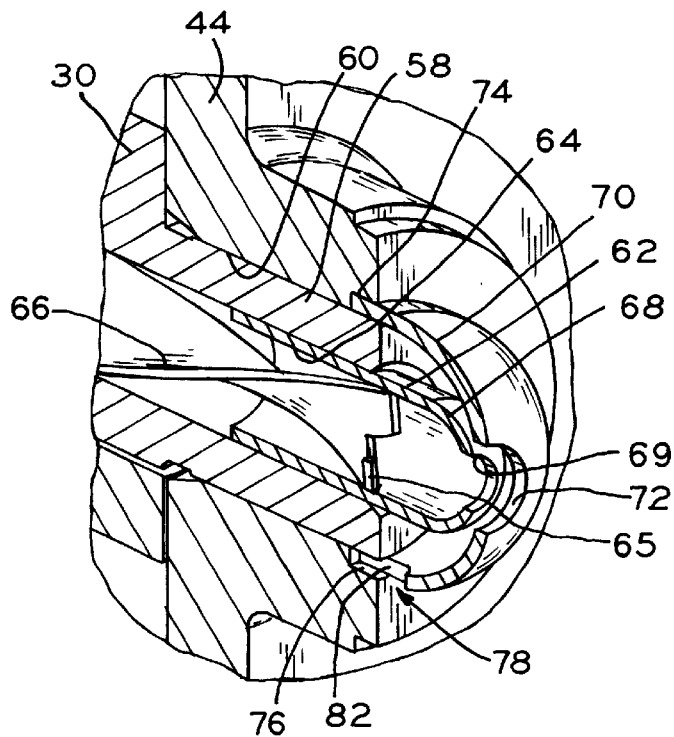
FIG_4
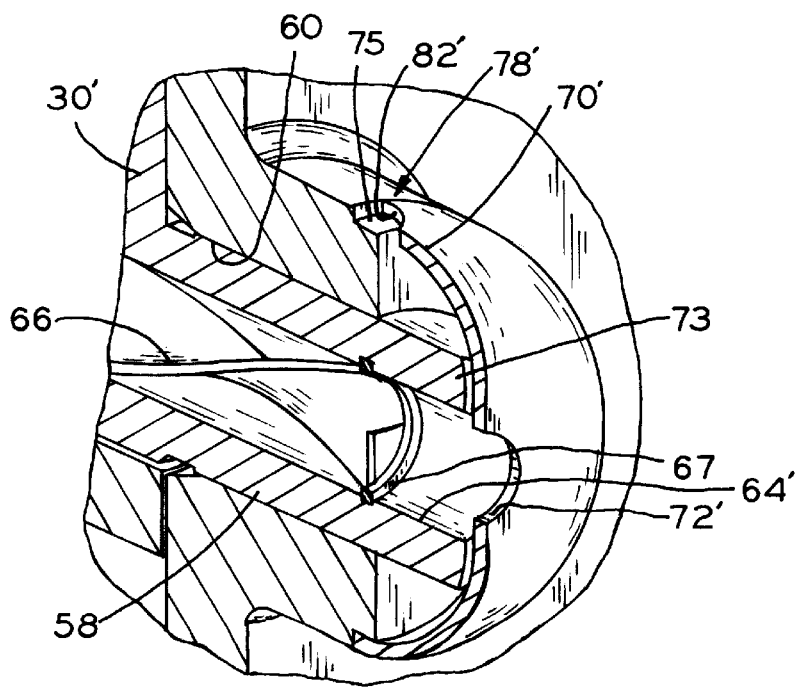
FIG_5

COMPRESSOR HAVING A LUBRICANT PICK-UP TUBE GUARD

BACKGROUND OF THE INVENTION

The present invention relates to lubrication systems for hermetic compressors and in particular vertically oriented hermetic compressors having a pick-up tube or shaft end which extends into the oil contained in a sump.

Hermetic compressors having hollow shafts or pick-up tubes which extend into the oil contained in a sump are used for drawing lubricant from the sump and providing it to moving parts of the compressor assembly. Often these tubes or shafts are provided with a paddle for pumping the oil through the shaft or tube. A problem experienced with pick-up tubes or shafts is that on their rotation they tend to create vortices around the end of the shaft or tube which extends into the oil. These vortices hinder the performance of oil delivery into the tube or shaft. A way of preventing the formation of these vortices is desirable.

SUMMARY OF THE INVENTION

The present invention provides an oil inlet guard disposed about the end of a rotating oil pickup tube or shaft provided with an oil passage opening. The guard is fixed such that it does not rotate and is provided with a central oil aperture through which oil flows from the sump into the rotating shaft or pick-up tube. The guard smooths the oil which flows into the pickup tube or shaft, eliminating flow-disrupting vortices and increasing the oil pick-up performance of the shaft or tube.

The present invention provides a compressor assembly including a housing having an oil sump in which is contained a liquid lubricant, a compressor mechanism disposed within the housing, a vertical, rotatable shaft associated with the compressor mechanism and provided with a conduit having an downwardly directed open end which extends beneath the surface level of the lubricant in the sump and through which oil is conveyed to the compressor mechanism, and a guard in surrounding relationship with the conduit open end and having an aperture disposed beneath and proximal to it, the guard fixed relative to the housing, the sump in fluid communication with the conduit through the guard aperture.

BRIEF DESCRIPTION OF THE DRAWINGS

The above-mentioned and other features and advantages of this invention, and the manner of attaining them, will become more apparent and the invention itself will be better understood by reference to the following description of the embodiments of the invention taken in conjunction with the accompanying drawings, wherein:

FIG. 1 is a sectional side view of a hermetic compressor according to a first embodiment of the present invention;

FIG. 2 is an enlarged fragmentary sectional side view of a portion of the compressor shown in FIG. 1, showing the pick-up tube and guard in greater detail;

FIG. 3 is a fragmentary sectional side view of a portion of a compressor according to a second embodiment of the present invention, showing the pick-up tube and guard;

FIG. 4 is a fragmentary sectional perspective view of the compressor portion shown in FIG. 2, also showing an alternative vent configuration; and FIG. 5 is a fragmentary sectional perspective view of the compressor portion shown in FIG. 3, also showing an alternative vent configuration.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates one embodiment of the invention, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description.

Referring to FIG. 1, there is shown a first embodiment of a compressor according to the present invention. Vertically-oriented compressor assembly 20 is of the rotary type, although it is to be understood that the present invention is adaptable to other types of vertical compressors such as, for example, scroll compressors, rotary vane compressors and reciprocating piston compressors. Compressor assembly 20 comprises outer shell 22 and has, disposed within shell 22, motor assembly 24 having stator 26 and rotor 28. Rotor 28 is provided with shaft 30 having axial bore 32 extending therethrough. Shaft 30 is jounalled in main bearing 34 which comprises in part compressor mechanism 36.

Compressor mechanism 36 is of the rotary type having cylinder block 38 disposed between axial surface 40 of bearing 34 and axial surface 42 of outboard bearing 44. Cylinder block 38 is provided with cylindrical cavity 46 in which is disposed eccentric 48 attached to or integral with shaft 30. Disposed about and rotatable relative to eccentric 48 is cylindrical piston 50 which moves about cavity 46 in an epicyclic fashion. A vane (not shown) is biased by a spring (not shown) against the outer surface of piston 50, the vane reciprocating in a slot (not shown) provided therefor in cylinder block 38. Discharge and suction ports (not shown) are disposed on opposite sides of the vane and allow refrigerant to enter and exit a compression chamber of compressor mechanism 36 in the known way. Refrigerant enters compressor mechanism 36 through via a suction tube (not shown) and exits compressor assembly 20 through discharge tube 52, compressor assembly 20 being of the type in which the entire interior of shell 22 is at discharge pressure.

Disposed in the bottommost portion of shell 22 is lubricant sump 54 containing a quantity of oil having surface level 56. As best seen in FIG. 2, shaft 30 has portion 58 radially supported in journal 60 of outboard bearing 44 and provided with pick-up tube 62 which is interference-fitted into a pump receiving portion 64 of shaft bore 32. Within bore portion 64 is disposed helical paddle 66 which serves as a pump for helping to convey lubricant from sump 54 through shaft bore 32. Paddle 66 may be retained in bore portion 64 by means of clip 65. Pick-up tube 62 extends below surface level 56 of the lubricant in sump 54 and its tip 68 is provided with axial opening 69 (FIG. 2) through which oil is received into shaft bore 32.

Alternatively, as shown in the second embodiment of FIG. 3, shaft portion 58' itself extends below oil surface level 56, with shaft 30' not provided with a pick-up tube such as pick-up tube 62. As seen in FIG. 3, paddle 66 is provided in shaft bore portion 64', and may be retained therein by means of clip 65 or, as shown, by snap ring 67. Further, shaft 30 or 30' may not be provided with paddle 66 at all, instead relying on alternative pump means (not shown) for helping to convey lubricant from sump 54 through shaft bore 32.

Affixed to the bottommost end of outboard bearing 44 is guard 70 which encloses oil pick up tube tip 68 and, as shown, may be somewhat hemispherically or domed shaped. Guard 70 is provided with aperture 72 which is downwardly directed and in close proximity with tip 68 of pick-up tube 62. The inside surface of guard 70 near its aperture 72 is contoured such that it surrounds the open end of tip 68. The vertical clearance between the bottommost portion of tip 68, in which oil inlet aperture 69 is provided, and the inside surface of guard 70 therebeneath is preferably approximately 0.020 to 0.030 inch, indicated as distance A in FIG. 2. Guard 70 is provided with cylindrical portion 74 which is interference-fitted into counterbore 76 provided in outboard bearing 44. Provided in guard 70 near cylindrical portion 74 and below counterbore 76 is at least one vent 78 which allows air and oil to escape the interior of guard 70 during oil filling. As shown in FIG. 2, vent 78 may be formed by providing hole 80 in the surface of guard 70 or, as shown in FIG. 4, vent 78 may be formed by providing axially elongate notch 82 in cylindrical portion 74 of guard 70.

Similarly, as shown in FIG. 3, the second embodiment of the present invention has, affixed to the bottommost end of outboard bearing 44', guard 70' which encloses tip 73 of shaft 30' and may also be somewhat hemispherically or domed shaped and provided with downwardly directed aperture 72'. The inside surface of guard 70' near its aperture 72' is contoured such that it surrounds shaft tip 73. The vertical clearance between tip 73 the inside surface of guard 70' therebeneath is preferably approximately 0.020 to 0.030 inch, indicated as distance A in FIG. 3. Aperture 72' is in close proximity to tip 73 of shaft 30, which may be contoured to approximate the inner surface configuration of guard 70'. The clearance between shaft tip 73 and the inside, adjacent surface of guard 70' is likewise preferably approximately 0.020 to 0.030 inch. Guard 70' is provided with cylindrical portion 74' which is interference-fitted to annular shoulder 75 provided in outboard bearing 44'. To allow air and oil to escape the interior of guard 70' during oil filling, at least one vent 78' is provided in guard 70' near cylindrical portion 74' and below shoulder 75. As shown in FIG. 3, vent 78' may be formed by providing hole 80' in the surface of guard 70' or, as shown in FIG. 5, vent 78' may be formed by providing axially elongate notch 82' in cylindrical portion 74' of guard 70'.

Guard 70, 70' may be made of plastic or stamped sheet metal. As indicated above, in the shown embodiments guards 70, 70' are interference-fitted to bearings 44, 44', but may alternatively be adhered, welded or brazed thereto. Apertures 72, 72' (FIGS. 2, 3) axial pickup tube opening 69 (FIG. 2) and/or shaft bore portion diameter 64' (FIG. 3) are appropriately sized to accommodate the compressor size and type, and the amount of oil required for proper lubrication.

Referring to the first embodiment of FIGS. 1, 2 and 4, in operation, as shaft 30 and pick-up tube 62 rotate within fixed outboard bearing 44 and guard 70 affixed thereto, oil from sump 54 enters guard aperture 72 and flows immediately into pick-up tube guard opening 69. The oil outside of guard 70 is generally still, and does not have vortices which may disrupt the flow of lubricant through guard opening 72, and thus into pick-up tube opening 69. It is expected that vortices are created adjacent the outer surfaces of pick-up tube 62 inside of guard 70, these vortices, however, do not appreciably adversely affect the flow of oil from sump 54 through openings 72, 69 into shaft bore 32. As can be readily visualized with reference to FIGS. 3 and 5, the second embodiment of the present invention operates in the same way to prevent the formation of vortices within the oil sump which disrupt the flow of lubricant into the shaft bore.

While this invention has been described as having exemplary designs, the present invention may be further modified within the spirit and scope of this disclosure. Therefore, this application is intended to cover any variations, uses, or adaptations of the invention using its general principles. For example, aspects of the present invention may be applied to compressors other than rotary compressors, or may be adapted to compressors having the compressor mechanism located in the upper portion of the compressor shell, the depending end of the shaft immersed in the sump, its conduit opening within the inventive guard as described above. Further, this application is intended to cover such departures from the present disclosure as come within known or customary practice in the art to which this invention pertains.

What is claimed is:

1. A compressor assembly, comprising:
   a housing having an oil sump, said sump containing a liquid lubricant;
   a compressor mechanism disposed within said housing;
   a vertical, rotatable shaft associated with said compressor mechanism and provided with a conduit having an open end through which oil is conveyed to said compressor mechanism, wherein said conduit open end is downwardly directed, said conduit open end extending beneath the surface level of said liquid lubricant, whereby said lubricant is drawn into said conduit open end; and
   a guard in surrounding relationship with said conduit open end and having an aperture disposed beneath and proximal said conduit open end, said guard fixed relative to said housing, said sump in fluid communication with said conduit through said aperture, said guard provided with a vent, said vent fluidly communicating the interior of said sump;
   a portion of the liquid lubricant in said sump being received into said guard, a portion of said liquid lubricant received into said guard being expelled from said interior of said guard through said vent during compressor operation.

2. The compressor of claim 1, wherein said vent is defined by a hole in said guard.

3. The compressor of claim 1, wherein said vent is defined by a notch in said guard.

4. The compressor of claim 1, wherein said conduit is rotatable, and at least a portion of the liquid lubricant within said guard has a motion which is induced by rotation of said conduit, a portion of the liquid lubricant within said sump being drawn into said guard through said aperture by said motion.

5. The compressor of claim 4, a portion of the liquid lubricant within said guard being expelled from said guard through said vent by said liquid lubricant being drawn into said guard through said aperture by said motion.

6. The compressor of claim 4, wherein said conduit comprises a portion of said shaft.

7. The compressor of claim 4, wherein said conduit comprises a pickup tube.

* * * * *

UNITED STATES PATENT AND TRADEMARK OFFICE
CERTIFICATE OF CORRECTION

| | | |
|---|---|---|
| PATENT NO. | : 6,171,090 B1 | Page 1 of 1 |
| DATED | : January 1, 2001 | |
| INVENTOR(S) | : David C. Hurley | |

It is certified that error appears in the above-identified patent and that said Letters Patent is hereby corrected as shown below:

<u>Claim 1, column 4,</u>
Line 41, after "said" insert -- guard and said --

Signed and Sealed this

Twenty-fifth Day of September, 2001

*Attest:*

NICHOLAS P. GODICI
*Attesting Officer*    *Acting Director of the United States Patent and Trademark Office*